US008278589B2

(12) United States Patent
Millan et al.

(10) Patent No.: US 8,278,589 B2
(45) Date of Patent: Oct. 2, 2012

(54) CONTINUOUS FURNACE WITH COUPLED LASER FOR THE SURFACE TREATMENT OF MATERIALS

(75) Inventors: Luis Carlos Estepa Millan, Saragossa (ES); German Francisco Fuente Leis, Saragossa (ES)

(73) Assignee: Consejo Superior De Investigaciones Cientificas, Madrid (ES)

( * ) Notice: Subject to any disclaimer, the term of this patent is extended or adjusted under 35 U.S.C. 154(b) by 933 days.

(21) Appl. No.: 12/282,023

(22) PCT Filed: Mar. 6, 2007

(86) PCT No.: PCT/ES2007/070047
§ 371 (c)(1),
(2), (4) Date: Jan. 14, 2009

(87) PCT Pub. No.: WO2007/101900
PCT Pub. Date: Sep. 13, 2007

(65) Prior Publication Data
US 2009/0230105 A1    Sep. 17, 2009

(30) Foreign Application Priority Data

Mar. 7, 2006    (ES) .................................. 200600560

(51) Int. Cl.
*B23K 26/00*    (2006.01)
(52) U.S. Cl. .......... 219/121.65; 219/121.85; 219/121.66
(58) Field of Classification Search ............. 219/121.85, 219/121.65, 121.66, 121.83, 121.86; 427/376.2; 156/89.11
See application file for complete search history.

(56) References Cited

U.S. PATENT DOCUMENTS
4,177,372 A * 12/1979 Kotera et al. .................. 117/39
(Continued)

FOREIGN PATENT DOCUMENTS
ES    2170525    8/2000
(Continued)

OTHER PUBLICATIONS

Kingery W.D., et al., Ceramic Processes and Products, Introduction to Ceramics, 2nd Edition, pp. 3-20, 1976.
(Continued)

*Primary Examiner* — M. Alexandra Elve
(74) *Attorney, Agent, or Firm* — Leason Ellis LLP

(57) ABSTRACT

A continuous furnace 4 to which a laser is coupled by conventional optical means that allows the surface treatment of a part, with which it is possible to achieve temperatures of up to 3000° C. on said surface while the remainder of the part is at a substantially lower temperature. The part in the furnace is heated to a temperature of the order of 500° C. and, via an opening 5, a laser-beam bundle is applied to the part, scanning a line perpendicular to the direction of movement of the part such that the entire surface is scanned by means of the mechanical advance of the part. This scanning should extend beyond the lateral ends of the part. This type of laser-beam generator must be made compatible with the various colors with which the surface of the part is decorated. The furnace is divided into different zones, with independent temperature controls, for successfully achieving the desired values, both for heating and for cooling. The system that generates laser radiation and its deflector comprises a radiation generation/emission cavity ($CO_2$ laser, around 10.6 mm, or diode or Nd lasers in different varieties thereof) and the emitted-beam-handling system, which may consist of a system of galvanometers or a series of combinations of lenses for successfully shaping the beam and applying it in a manner suited to the type of process, material treated and laser used.

16 Claims, 4 Drawing Sheets

U.S. PATENT DOCUMENTS

| | | | | |
|---|---|---|---|---|
| 4,764,102 | A | * | 8/1988 | Takahashi ..................... 425/466 |
| 5,085,166 | A | * | 2/1992 | Oka et al. ..................... 118/50.1 |
| 5,112,698 | A | * | 5/1992 | Horvei et al. .................. 428/632 |
| 5,254,833 | A | * | 10/1993 | Okiyama .................. 219/121.68 |
| 6,064,034 | A | * | 5/2000 | Rieck ........................ 219/121.85 |
| 6,107,614 | A | * | 8/2000 | Linn et al. ..................... 219/700 |
| 6,486,435 | B1 | * | 11/2002 | Beyer et al. ................. 219/121.8 |
| 6,635,846 | B1 | * | 10/2003 | Rieck ........................ 219/121.69 |
| 6,852,948 | B1 | * | 2/2005 | Harrison .................. 219/121.85 |
| 7,112,760 | B2 | * | 9/2006 | Ishikawa et al. .......... 219/121.76 |
| 7,164,519 | B2 | * | 1/2007 | Han et al. ..................... 359/216.1 |
| 2003/0015509 | A1 | * | 1/2003 | Gaissinsky et al. ....... 219/121.85 |

FOREIGN PATENT DOCUMENTS

WO     WO 96/39915     12/1996

OTHER PUBLICATIONS

Sanchez-Munoz L., et al., Introduction a la Ceramic y Su Industria, Materias Primas y Aditivos Ceramicos, pp. 17-47, 2002.

Escribano Lopez, P. et al., La Industria de Fritas y Esmaltes Ceramicos and Procesos de Sintesis de Materiales Ceramicos, Esmaltes y Pigmentos Ceramicos, pp. 21-35 & 247-259, 2001.

Rubahn, H. G., Fundamental Laser Surface Treatment, Laser Applications in Surface Science and Technology, 1999.

de Damborenea, J, Surface modification of metals by high power lasers, Surface and Coatings Technology, pp. 377-382, 1998.

Chan, C. M. et al., Polymer surface modification by plasmas and photons, Surface Science Reports 24, pp. 1-54, 1996.

Zhou B.H. et al., Experimental and theoretical analyses of cutting nonmetallic materials by low power $CO_2$-laser, Journal of Materials Processing Technology pp. 188-192, 2004.

Perrie, W. et al., Femtosecond laser micro-structuring of alumina ceramic, Applied Surface Science, pp. 213-217, 2005.

Sugioka, K. et al., Advanced materials processing based on interaction of laser beam and a medium, Journal of Photochemistry and Photobiology A: Chemistry, pp. 171-178, 2003.

Qi, J. et al., A study on the laser marking process of stainless steel, Journal of Materials Processing Technology, pp. 273-276, 2003.

Larrea, A. et al., $ZrO_2$-$Al_2O_3$ eutectic plates produced by laser zone melting, Journal of the European Ceramic Society, pp. 191-198, 2002.

Mora M., et al., Laser Textured Bi-2212 in Planar Geometries, IEEE Transactions on Applied Superconductivity, vol. 13, No. 2, pp. 3188-3191, 2003.

* cited by examiner

CONTINUOUS FURNACE WITH COUPLED LASER FOR THE SURFACE TREATMENT OF MATERIALS

OBJECT OF THE INVENTION

In industrial sectors, such as ceramics, where the supply of heat is essential, laser technology is capable of offering large-scale surface treatments that were previously inconceivable from the point of view of conventional technology. The present invention, by incorporating lasers into conventional treatment systems, offers benefits in terms of energy consumption and $CO_2$ emissions that can make formerly unviable processes economically attractive and profitable, while at the same time carrying out new processes that are impossible using current techniques.

The system object of the invention is composed of a continuous kiln whereto is attached a laser by conventional optical means that permit the surface treatment of the piece with the sweep of a laser beam in various opto-mechanical configurations, configurations which can correspond, among others, to any of the following:

- Galvanometer systems with fixed focal length lenses.
- Galvanometer systems with plane lenses.
- Cylindrical lens systems.
- Parabolic-convex mirror systems.
- Beam-splitting systems for treatments in parallel, in series and symmetrical on upper and lower faces.
- Combinations of the abovementioned systems with plane mirrors.

The proposed invention, which uses laser radiation focused on the piece, while simultaneously keeping the mass of the piece at a low temperature through conventional heating, can reach very high temperatures (up to 3000° C.) on the surface. This allows coatings with a high mechanical or functional performance (electronic, optical, etc.) to be achieved, such as special glazes with currently unreachably high melting points. Thus, by lowering the temperature of the mass of the piece when can achieve high savings in energy consumption and in $CO_2$ emissions in the process, in addition to a potential reduction in the size of the treatment system.

STATE OF THE ART

Materials have been treated using lasers virtually since the time commercial lasers came into use several decades ago. The use of lasers for cutting, marking and welding operations of an enormous variety of materials is commonplace nowadays in many industrial sectors, and there are high performance commercial systems for use in industrial environments. The reliability, flexibility and adaptability of lasers to highly productive processes, together with the other benefits that lasers provide (reduction of residues and a healthier work environment among others), and their gradual miniaturisation and increased efficiency foretell a substantial increase in their adaptation to new transformation processes in the materials industry in general.

Where the present invention is concerned, the scientific and technical background described by the state of the art is summarised as follows.

The production of ceramic materials is generally associated with high temperatures, characteristic of the particular sintering processes related to the various desired compositions, microstructures and properties thereof. [Introduction to Ceramics, W. D. Kingery, H. K. Bowen, D. R. Uhlmann, Wiley, New York (1976), $2^{nd}$ Edition]. For example, in the tile industry it is common for most products used for flooring and cladding to have sintering temperatures of between 1100 and 1300° C. In order to produce industrial quantities of these products, very long continuous kilns have been developed in recent decades, with the pieces supported and transferred based on the use of ceramic rollers.

The greatest advance made over this period is perhaps the development of single-firing which permits optimising and minimising the duration of the sintering process, avoiding multiple firings and allowing the piece to be decorated and consolidated in a single process [Materias Primas y Aditivos Cerámicos, L. Sánchez-Muñoz and J. B. Carda Castelló, Enciclopedia Cerámica, tome II.1. Faenza Editrice Ibérica, S. L., Castellón (2002)]. Although the results have been satisfactory and in many cases spectacular, the level of the art appears to have reached a degree of evolution where only qualitative changes will make it possible to improve the properties of the ceramic materials so that they remain competitive against other options (compounds, for example) which have been evolving considerably in recent years [Esmaltes y Pigmentos Cerámicos, P. Escribano López, J. B. Carda Castelló, E. Cordoncillo Cordoncillo, Enciclopedia Cerámica, tome 1, Faenza Editrice Ibérica, S. L., Castellón (2001)].

An attractive way of obtaining ceramic products with significantly improved properties and performances is to increase the sintering temperature on the surface. However, in order to achieve this objective an unconventional treatment is required, which does not overheat the mass of the ceramic material whose integral stability is established in the previously mentioned temperature range. Any increase in temperature of the surface treatment necessarily implies a technological change in the heat supply since conventional kilns heat the piece uniformly in order to avoid tensions and the resulting deformations and/or cracking that usually degenerate into the material's disintegration by means of various breaks.

Laser is one of the most feasible techniques for integrating into automated industrial processes, which additionally allows the surface of materials to be heated selectively [Laser Applications in Surface Science and Technology, H.-G. Rubahn, Wiley, Chichester (1999)]. Laser is used in very diverse industrial sectors including metallurgy [J. de Damborenea, *Surface modification of metals by high power lasers*, Surface & Coatings Technol. 100-101 (1998) 377-382], polymers [C.-M. Chan, T.-M. Ko, H. Hiraoka, *Polymer surface modification by plasmas and photons*, Surface Science Reports 24 (1996) 1-54], wood [B. H. Zhou, S. M. Mandavian, *Experimental and theoretical analyses of cutting non-metallic materials by low power CO2-laser*, J. Materials Processing Technol. 146 (2004) 188-192], electronic ceramics [W. Pierre, A. Rushton, M. Gill, P. Fox, W. O'Neill, *Femtosecond laser microstructuring of alumina ceramic*, Appl. Surf. Sci. 248 (2005) 213-217], etc. Essentially, it is used for marking, cutting, surface treatments and welding [K. Sugioka et al, *Advanced materials processing based on interaction of laser beam and a medium*, J. Photochemistry and Photobiology A: Chemistry, 158 (2003) 171-178; UV laser marking in III-Vs Review 17 (2004) 30; J. Qi, K. L. Wang, Y. M. Zhu, A study on the laser marking process of stainless steel, J. Mater. Processing Technol. 139 (2003) 273-276].

From the point of view of the present invention, the nearest approximation comprises the research published by the authors and carried out in their laboratories regarding the treatment of eutectic ceramics [A. Larrea, G. F. de la Fuente, R. I. Merino, V. M. Orera, $ZrO_2$—$Al_2O_3$ *Melt Growth Eutectic plates produced by laser processing*, J. Eur. Ceram. Soc. 22 (2002) 191-198] and regarding superconductors [M. Mora, J. C. Diez, C. I. López-Gascón, E. Martínez, G. de la Fuente, IEEE Trans. Appl. Supercon. 13 (2003) 3188-3191].

Nonetheless, there are substantial differences in terms of the methodology and the equipment and the optics used in these cases compared to what is described herein. In essence, the sweeping laser system, in addition to the optical assembly and heating of the piece, represents the key difference therebetween.

Although we consider that they do not affect the novelty of the present invention, we would mention two patent documents here: EP 0836405 (German priority DE 4316829) "Method and arrangement for surface treatment with temperature control, particularly for superficial hardening with laser radiation" and Spanish ES 2170525 (from a European patent that designates Spain and stemming in turn from a priority U.S. Pat. No. 944,428) "Method for connecting surface mount components to a substrate". The former poses a similar problem to the one considered in the present invention but only coincides with the present solution in terms of its use of laser beams; the second uses laser beams in order to increase the energy supplied by the kiln for treating the piece, but the way of operating is totally different to the one of the present invention in view of the different objectives pursued.

DETAILED DESCRIPTION OF THE INVENTION

Figure 1:
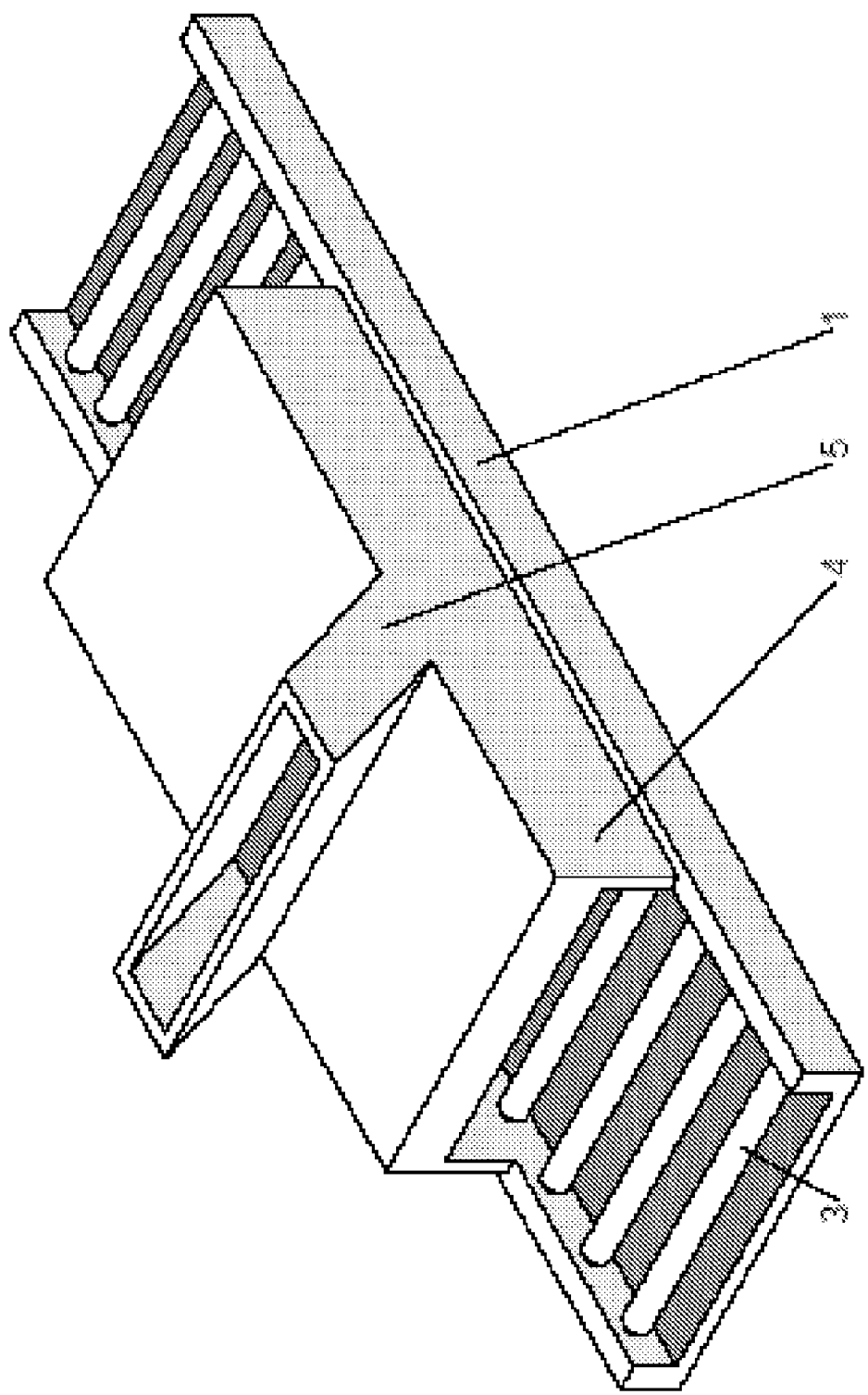
FIG. 1. Schematic representation of the kiln object of the present invention.

Devices that use galvanometric mirrors in order to sweep the surface of a particular material with a laser beam are well known. This allows the surface to reach temperatures of several thousand degrees Centigrade and thus achieves various objectives. However, surprisingly, it has been found that when applying this technique to ceramic and other similar types of pieces, although the required temperatures are reached, the result is totally unsatisfactory due to the cracking of the surface as a result of the mechanical tensions and roughness generated on the surface.

Likewise, kilns as systems for heating, treating and transforming materials have also been known for many years. Incorporating the right type of instrumentation allows kilns to be used and controlled much more efficiently. However, in some processes carried out in kilns structural modifications occur that result in unwanted properties of the materials. On other occasions, the enormous physical differences, such as the melting point of the materials, make it impossible to carry out certain processes using just a conventional kiln.

As a consequence of the tests carried out by the inventors, these problems were found to disappear if the following parameters were adopted from the outset:

1. Heating the piece in a conventional kiln, at a temperature of up to several hundred degrees below its melting point, prior and subsequent to treating the surface of the piece with a laser beam. This prevents cracking.
2. The laser beam should move in a pendular fashion only over a line of the piece. Sweeping the surface should be achieved by means of the piece's mechanical advance, perpendicular to the sweeping line. This will prevent roughness.
3. The sweep must surpass the sides of the piece as shown in the B-B' section of the drawing of FIG. 2. This will prevent micro-cracks and minor roughness.
4. The type of laser beam generator must be selected according to the materials, in order to prevent the energy supplied by the beam from being absorbed by the surface due to a "colour" coincidence.

Figure 2:
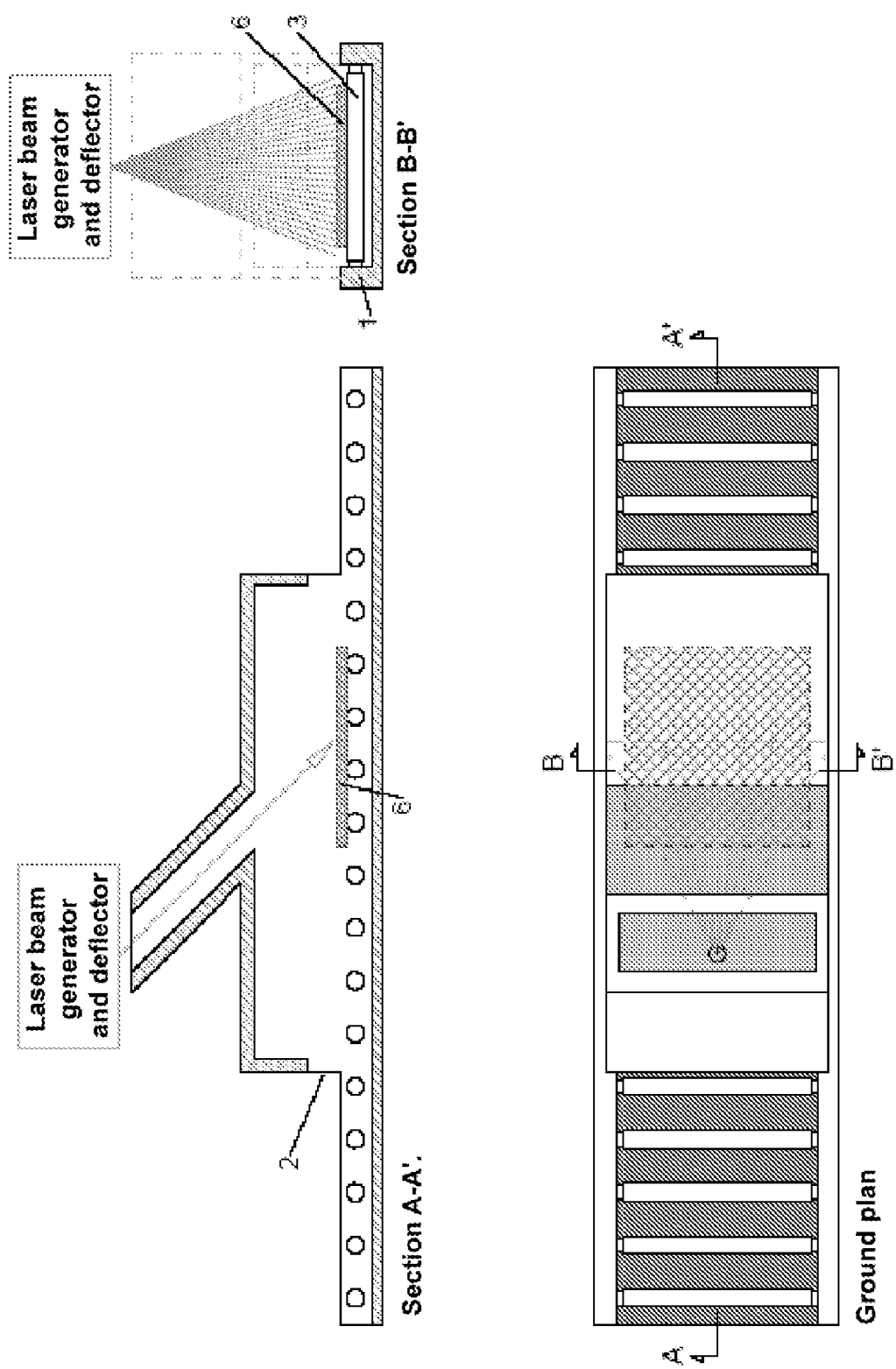
FIG. 2. Diagram of the sweeping system of a ceramic piece.

FIGS. 1 and 2 show a very simplified diagram of the device object of the present invention. Essentially, it consists of a bench 1, which contains a conventional system for transporting the ceramic pieces to be treated 6, (depicted in the figure as a roller conveyor, 3) which are introduced through the opening 2, into a conventional kiln 4. The kiln has a special feature on its top, of an inlet 5 (with a slight horizontal incline) to allow the laser beam to pass through it and fall (as shown more clearly in the elevational view of FIG. 2) on the ceramic piece to be treated 6. The inclination of the inlet 5 is designed so that the radiation of the kiln (which is at a temperature of approximately 500° C.), and particularly that of the piece 6 (even hotter than the kiln), is mostly extracted.

FIG. 2 shows the essential components of the present invention, and includes a ground plan drawing and two section drawings (A-A' and B-B') to show how using a laser beam generating system and the corresponding deflector a sort of fan is created that generates a "hot" line on the surface of the ceramic object, surpassing the side edges of the surface of the ceramic piece 6, a line that moves backwards as the piece advances transported by the rollers 3 or its equivalent conveying system.

The enclosure 4 is heated by means of electrical resistances or gas or fuel combustion, and is thermally insulated in order to improve energy efficiency. The enclosure is divided into different zones with separate temperature controls in order to reach the required values for the heating and cooling temperatures.

Said enclosure has, as has been mentioned, the suitable openings for introducing the laser beam, as well as a conveying system that carries the peace for treating. The conveying speed can vary and is regulated according to the materials treated and the processes carried out.

Laser Generating System and its Deflector.

Although individually this system is based on a commercial unit, its description and adaptation to the invention's assembly is necessary because it forms an essential part of the assembly. The system comprises:

The radiation generation and emission cavity. This may be of different types emitting different radiations, from ultraviolet radiation to infrared. The most common are those corresponding to a $CO_2$ laser, of about 10.6 µm, and the diode and Nd lasers in their different forms, encompassing wave lengths between 0.8 µm and 1.1 µm.

The manipulation of the emitted beam. In order to achieve a linear sweep of the piece, which is fundamental in the present invention, said sweep may be carried out by means of a galvanometer system or through a series of lens combinations that shape the beam and make it fall as appropriate for the type of process, treated material and laser used.

Figure 3:
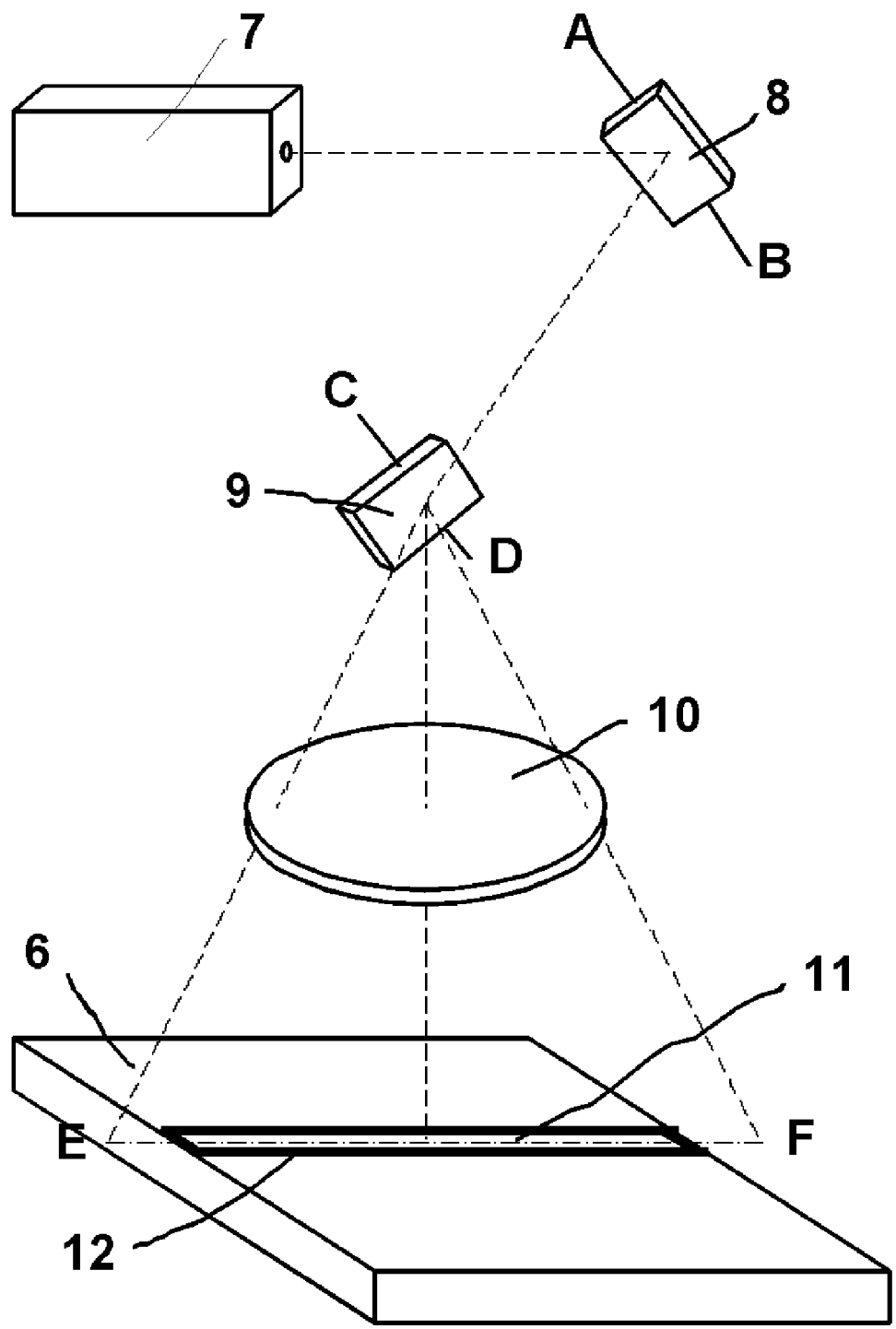
FIG. 3. Simplified diagram of the laser emission system.

FIG. 3 shows a very simplified diagram of one of the ways that it can be adapted for this purpose. We would mention for clarity's sake that the drawings are not to any scale.

The laser source 7, emits the selected type of radiation (marked as a jagged line) which falls on the first mirror 8 of the assembly; this mirror may remain fixed or oscillate over the axis AB, by means of a galvanometric system, in order to carry the beam to a second mirror 9, similar to the previous one, which makes the beam fall on the lens 10, which, in turn directs the beam over piece 6 whereon the process is carried out. As the mirror 9 oscillates over its CD axis, it makes the focal point of the beam run over segment EF of the dotted line 11, a segment that is broader than the width of piece 6. The heating produced by the sweep of the beam may form a band 12 of melted material (or thermally treated if this was the objective) on the surface of the piece 6. This way, by combining the sweep of the beam with the movement of the piece 6, the entire surface is subjected to the desired thermal treatment.

Figure 4:
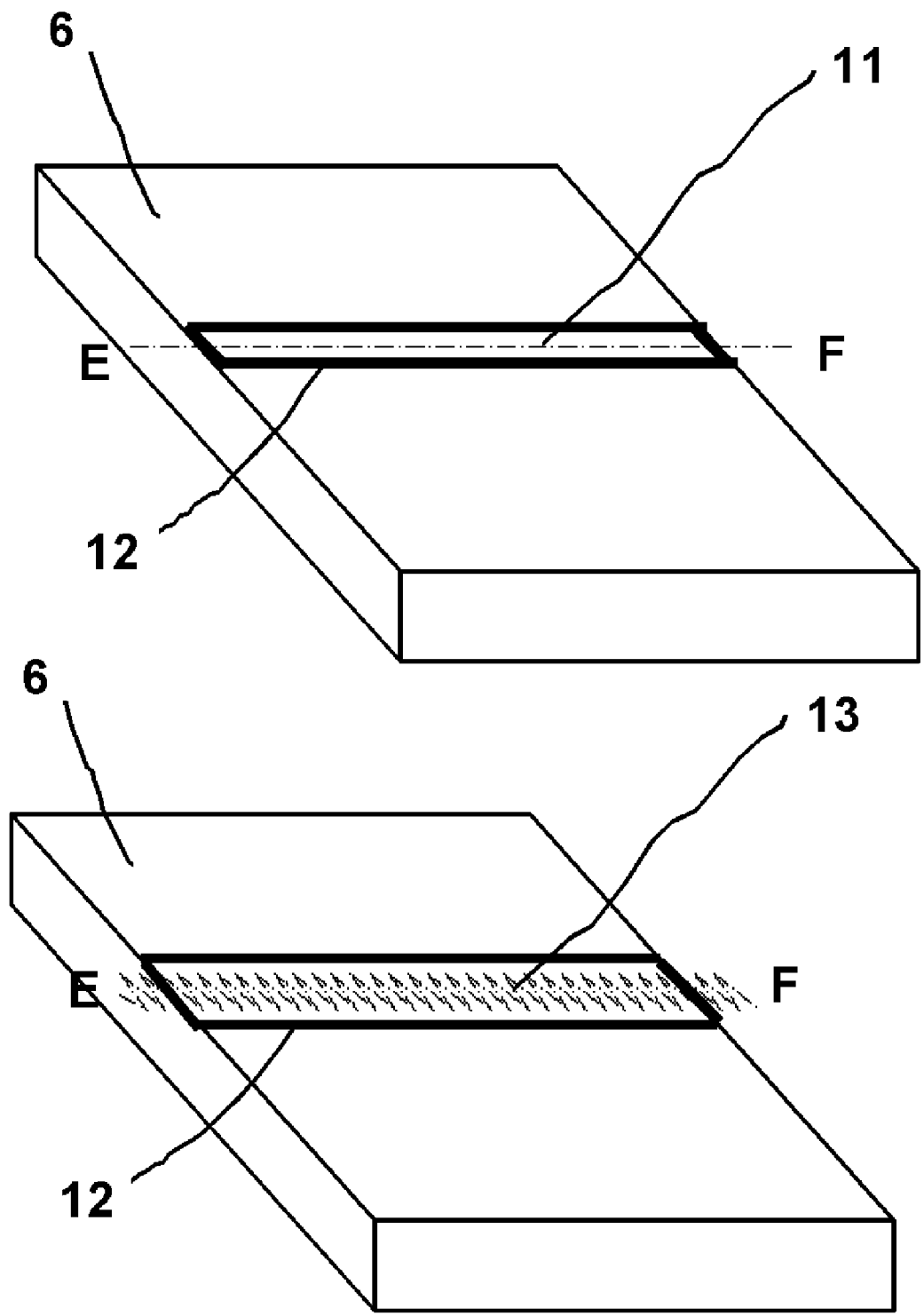
FIG. 4. Close-up of the width of the sweeping area when the laser beam generates a broken line.

As mentioned, optionally, mirror 8 may also oscillate on its axis AB in such a way that through a combination of the two oscillations, instead of the straight line 11 of FIG. 3 (and the upper drawing of FIG. 4), the sweep of the laser beam generates a jagged line 13, as shown in the lower drawing of FIG. 4, which translates into an increase in the width of the thermally treated zone 12.

When applying the present invention to large-size pieces, the beam that reaches the side ends of the piece because they are further away from the optical centre, carries less energy and this problem is resolved by installing a plane lens.

Control System.

The whole system includes computer software for controlling the required intensity, emission time, stoppage and movements of the radiation as described below:

Once the system has been initialised, the first step of the operation involves configuring the general parameters. These general parameters include:

The work area, introducing the values of two dimensions, and

The focal length, i.e. the distance between the lenses and the work piece.

Next, the type of beam movement is selected.

The software (commercial) offers different possibilities; for example, the vector mode may be used, where the beam traces a continuous line.

Finally the power parameters are configured.

At this stage, the values are set for the following parameters:

The value of duty cycles. This value is the percentage of the beam's emission-stop time per pulse.

Work frequency, this value represents the number of times that the beam is emitted-switched off per second.

Beam speed, is the value in m/min of the beam's velocity.

After entering these parameters, they are stored in a file and the initiate cycle order is given.

EXAMPLE

Next, we describe a typical treatment in a laser kiln for a ceramic material of industrial interest. A piece composed of a red paste support with slip and serigraphy is introduced into the pre-heating zone of the laser kiln. The support of the piece is composed of moving rollers, which establish a speed for the piece of less than 8 m/h through the kiln's different zones.

The kiln is of a conventional type with a linear movement of the piece and heating through electrical elements; specifically for this test a Nanetti® brand electrical kiln was used, model ER-20. The linear movement is achieved by means of a series of rollers (made of suitable materials for the kiln's working temperatures) which are driven by a conventional motor-reducer-pinion-chain mechanical system. The kiln is divided into four zones wherein the temperature is controlled, from room temperature up to the maximum required (which could be 1300° C.), with a view to guaranteeing the kiln's correct value for each treatment. This control is achieved with the use of thermocouples and programmed controllers that indicate and establish the temperature values for the heating and cooling processes in each zone.

The kiln's enclosure has on its top an inlet (with a slight horizontal incline) that allows the laser beam to pass through it and to fall on the piece to be treated.

The temperatures of the heating and cooling zones are controlled independently in order to simulate a cycle in an industrial kiln. The laser beam is introduced in the heating zone, as mentioned, by means of a horizontal inlet on the top of the kiln. This laser beam acts by sweeping over the piece as the piece advances through said zone. The piece follows the cycle established by the kiln, moving at a constant speed, with heating and cooling curves determined by the temperatures imposed on the kiln's different zones and by the conveying speed of the piece therein. The temperature of the hot zone for the piece in this example is approximately 600° C. and the result of the process is undistinguishable from that obtained through the conventional procedure of an industrial installation where a temperature of 1300° C. would have to be reached if the laser were not used. In this particular case, the advantage of the process lies in the fact that the kiln temperature is several hundred degrees less than in the industrial process with the ensuing energy savings and substantial reduction in carbon dioxide emissions generated by the combustion process used to heat said kilns. The size of the pieces is approximately 10 cm wide by 20 cm long with an 8 mm thickness.

The system used is a CO2 laser generator with a power of 300 W excited by radiofrequency. This laser is equipped with a Scanlab® galvanometer system with its RTC 3 PC interface card.

The invention claimed is:

1. A system for treating a surface of a material, comprising:
   a continuous kiln, comprising:
      a means for conveying a material through the kiln,
      an enclosure having an exterior top surface comprising an inlet, and
      two or more zones in the enclosure, wherein each zone is maintained at a different temperature, and
   a laser positioned such that a laser beam emitted by the laser enters through the enclosure inlet
   wherein the zones comprise:
      a first zone located before exposure to the laser beam, wherein the temperature is less than the temperature of the surface of the material during contact with the laser beam, and less than the melting point of the material;
      a second zone located where exposure to the laser beam occurs;
      a third zone located after exposure to the laser beam; and
      a fourth zone located after the third zone,
   wherein the temperature declines between the third zone and the fourth zone at a controlled rate, and
   wherein the material has a top surface and side edges, and wherein the laser sweeps across the top surface of the material while the material moves through the kiln and is conveyed in a direction perpendicular to the direction of the emitted laser beam, the laser beam sweeping in a pendular motion over a fixed line as the material is conveyed through the kiln and, wherein the sweep of the laser beam surpasses the side edges of the material.

2. The system of claim 1, wherein the enclosure inlet and the enclosure are made from the same material, and wherein the enclosure inlet protrudes from the exterior top surface of the enclosure at an angle of less than 90°.

3. The system of claim 1, wherein the enclosure is thermally insulated.

4. The system of claim 1, wherein the temperature of the top surface of the material is less than or equal to 3000° C.

5. The system of claim 1, wherein the laser is selected from $CO_2$ lasers, diodes, and Nd lasers.

6. The system of claim 1, wherein the laser beam has a wavelength ranging from 0.8 μm to 1.1 μm.

7. The system of claim 1, further comprising a plane lens to offset decreased laser beam power at the side edges of the material.

8. The system of claim 1, further comprising a means for heating the area inside the enclosure.

9. The system of claim 8, wherein the means for heating the area inside the enclosure is selected from electrical elements, gas, and fuel combustion.

10. The system of claim 1, further comprising:
a means for generating ultraviolet to infrared radiation; and
a means for altering the position of the emitted laser beam.

11. The system of claim 10, wherein means for generating ultraviolet to infrared radiation comprises a radiation generation and emission cavity.

12. The system of claim 1, further comprising a means for controlling the direction of the laser beam emitted by the laser.

13. The system of claim 12, wherein the means for controlling the direction of the emitted beam comprises an opto-mechanical configuration,
wherein the opto-mechanical configuration comprises a galvanometer system or a system of lens and mirror combinations that controllably oscillate, and adjusts the direction and shape of the laser beam to desired settings.

14. The system of claim 1, further comprising a computer having a processor, computer readable medium, and computer readable medium encoded with software configured to control the required intensity, emission time, stoppage, and movement of the radiation.

15. A method for treating the surface of a material, comprising the steps of:
(a) placing a material in a continuous kiln, comprising an enclosure having an exterior top surface comprising an inlet, wherein the material has a top surface and side edges and wherein the material passes through two or more zones in the enclosure, wherein each zone is maintained at a different temperature and wherein the zones in the enclosure comprise:
a first zone located before exposure to the laser beam, wherein the temperature is less than the temperature of the surface of the material during contact with the laser beam, and less than the melting point of the material;
a second zone located where exposure to the laser beam occurs;
a third zone located after exposure to the laser beam; and
a fourth zone located after the third zone,
wherein the temperature declines between the third zone and the fourth zone at a controlled rate; and
(b) propagating a laser beam through the enclosure inlet, such that the laser beam sweeps across the top surface of the material as it moves through the kiln, in a pendular motion over a fixed line as the material is conveyed through the kiln and in a direction perpendicular to the direction of the material moving through the kiln, and wherein the sweep of the laser beam surpasses the side edges of the material.

16. The method of claim 15, wherein the portion of the material not exposed to the laser beam has a lower temperature than the portion of the material exposed to the laser beam.

* * * * *